UNITED STATES PATENT OFFICE.

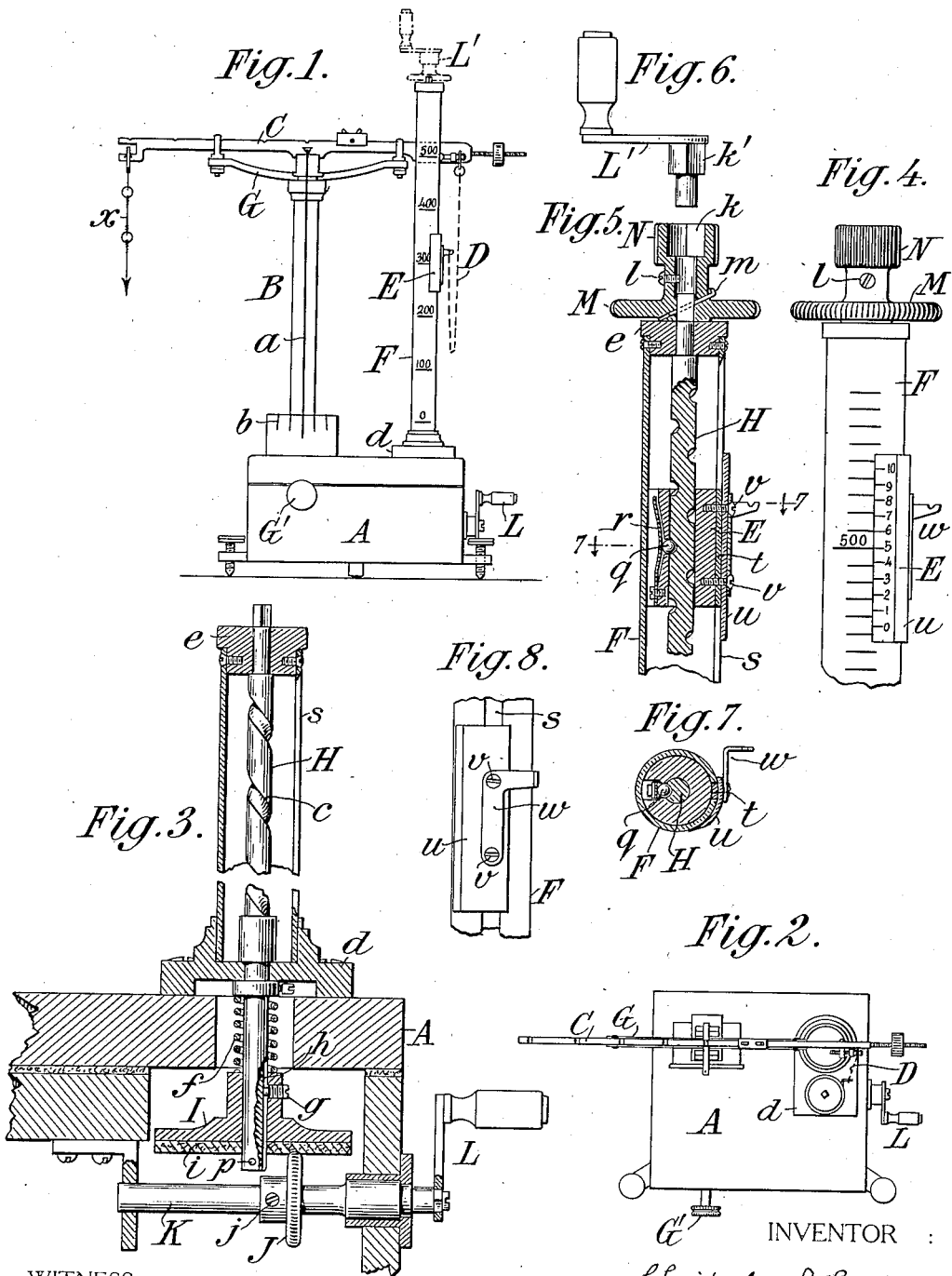

CHRISTOPHER A. BECKER, OF WEST NUTLEY, NEW JERSEY, ASSIGNOR TO THE TORSION BALANCE COMPANY, OF NEW YORK, N. Y., A CORPORATION OF NEW YORK.

WEIGHING SCALE OR BALANCE.

1,295,258.　　　　　Specification of Letters Patent.　　Patented Feb. 25, 1919.

Application filed December 28, 1917. Serial No. 209,287.

*To all whom it may concern:*

Be it known that I, CHRISTOPHER A. BECKER, a citizen of the United States of America, residing in West Nutley, in the county of Essex and State of New Jersey, have invented certain new and useful Improvements in Weighing Scales or Balances, of which the following is a specification.

This invention relates to weighing scales of the chain-balance type, that is to say, those in which chain is hung at one end from the beam, and at the other end from a vertically-movable support, so that by shifting the support more or less of the weight of the chain is thrown upon the beam, whereby the chain becomes a readily adjustable counterpoise, the weight being read off by graduations traversed by the vertically-movable support.

The present invention is an improvement upon the construction of such scales as set forth in my Patent No. 1,203,686, granted November 7, 1916. In that patent the adjustable support for the dead end of the chain is a slide moving upon a vertical guide or support and moved by means of a spiral groove or screw-thread in a rotatable spindle which, in the preferred construction, is turned through miter gears by means of a horizontal shaft on the base of the scale having a knurled head or operating knob outside of the base. The construction set forth in said patent is well adapted for an inclosed scale or balance, and for such or any type of scale has the advantages of being very quick and easy of manipulation, and weighing with extreme accuracy, the weighing operation being performable in much less time than with laboratory balances of ordinary construction.

The present invention aims to improve the construction of scales or balances of the chain counter-balance type, its objects being to cheapen and standardize the construction, to avoid backlash or lost motion, and to enable the scale to be readily adaptable to different modes of operation.

The accompanying drawings show the preferred embodiment of the invention.

Figure 1 is a side elevation of a suitable scale or balance;

Fig. 2 is a plan thereof;

Fig. 3 is a vertical section on a larger scale, in the plane of the movable chain support;

Fig. 4 is a side elevation of the upper part of such supporting structure;

Fig. 5 is a vertical section thereof;

Fig. 6 is an elevation of an operating crank applicable thereto;

Fig. 7 is a cross section on the line 7—7 in Fig. 5;

Fig. 8 is a fragmentary side elevation of the chain-support slide.

The particular scale or balance shown in Figs. 1 and 2 is selected merely for purposes of illustration. It comprises a base A supported in the usual manner upon adjusting screws; a column B for supporting the knife-edge mounting of the scale beam C; a weighing chain or counter-balance D attached at one end to the scale beam and at the other end to a vertically-movable support or slide E, and a vertical slideway or supporting member F on which such slide is mounted. The scale has the usual crosshead G for lifting the beam off from its knife edges when not in use, operated in the usual manner by means of a slide working within the column B and actuated by turning a knob G' projecting from the front of the base. The scale shown has the usual pointer *a* traversing graduated plate *b* to show when the scale is in poise. All these features, except those peculiar to the slide E and support F, to be described, are old, being set forth either in my said Patent No. 1,203,686, or in my pending application No. 206,621, filed December 11, 1917. The latter application discloses improvements in a specific gravity scale, and it is this particular type of scale that is selected for illustration in Figs. 1 and 2. In such scale the object to be weighed is suspended by means of a hanger *x* from the opposite arm of the scale beam to that carrying the chain D. For a disclosure of the details of this particular type of scale reference is made to my last-named application.

The only features of the present construction which require description are the adjustable chain support E and the means for guiding and moving it.

The support E is a vertically-moving slide inclosed within a tubular support or column F, and inclosing within it the upright shaft or screw spindle H which is formed, as heretofore, with a spiral groove *c* of steep pitch, so that the shaft H constitutes a quick-action screw and the slide E constitutes a nut driven upward or downward by this screw. The column F is formed as a tube, the bottom end of which is integral with, or is securely united to, a suitably broad foot or flange $d$ which is fastened down to the base A, while in the top of the tube is fastened a head $e$. The shaft H has journals which turn in suitable bearings in the foot $d$ and head $e$ of the column. The bottom end of the shaft H is prolonged down beneath the foot $d$ and carries a friction wheel or disk I which is driven by a friction wheel J fixed on a transverse shaft K which is mounted as heretofore, and passes out through the side of the base A, and on its end is fixed a crank L. By turning this crank motion is communicated through the friction gears J I to turn the shaft H. To maintain a uniform tractive engagement between these friction wheels the wheel I has a sliding non-rotative engagement with the shaft H and is pressed down by a spring $f$, which causes it to bear uniformly upon the wheel J. The wheel I is shown as having a prolonged hub through which passes a screw $g$ the inner end of which enters a groove $h$ formed in one side of the shaft H beneath its bearing in the foot $d$, whereby is constituted in effect a spline or feather connection such that the gear I can move up or down on the shaft, but the shaft must turn with the gear. This construction has the advantage that all lost motion is taken up by the spring $f$, all backlash between engaging miter gear teeth is avoided, and the driving connection, while sufficiently positive for practical requirements, is able to slip and avoid damage in case of any cause which obstructs the rotation of the shaft H, as, for example, when the slide E has been propelled to the top or bottom of its travel, in which case the gear J if further turned simply slips freely against the face of the gear I. Preferably, the gear I is formed with a yielding friction face of leather, rubber or other suitable material $i$.

The driving friction gear or disk J is fastened to its shaft K by a set screw $j$, so that the gear J may be set to engage the gear I at varying distances from the center of the latter whereby to change the gear ratio between the crank L and the shaft H. For very rapid weighing the arrangement shown may be used, which gives a gear ratio of approximately 1 to 1; or where extreme accuracy of weighing is of more importance than speed, the wheel J may be moved to the right until it reaches nearly the periphery of the wheel I, in which case the ratio may be reduced to approximately 1 to 2. Other ratios may be attained by intermediate adjustments or by using a wheel I of larger diameter, or a wheel J of smaller diameter.

The screw shaft H may be otherwise turned, as, for example, by the construction shown in Figs. 4 and 5. Here the upper end of the shaft is engaged by turning wheels or buttons M and N. These are knurled disks or heads which are formed integrally, and by turning either of which the shaft H may be turned. The shaft is shown as having a squared end projecting above the head $e$, which is engaged by a squared socket in the wheel M. For a quick coarse adjustment the operator may turn the smaller wheel N. For the final accurate adjustment he may more slowly turn the larger wheel M.

In many cases the user of the scale may prefer to operate it by a crank at the top of the column F. To this end a crank L′, shown in Fig. 6, is provided, which may be applied to the upper end of the shaft H. As shown, it engages the shaft H through the wheel N, the latter being hollowed and formed with a square or polygonal socket $k$ which is engaged by a similarly-shaped boss $k'$ on the crank. A set screw $l$ may be provided for holding the crank firmly in place and taking up looseness. Also, for holding the wheels N M on the squared end of the shaft F, a key or cotter pin $m$ may be inserted, or any other expedient may be used.

When the shaft H is to be turned by the wheels N M or crank L′, the crank L may be left in place and turn idly; or, if preferred, the crank L and its shaft K and gear J may be removed. In such case the gear I may also be removed, or it may be kept in place by providing a cotter pin $p$.

In my former patent the slide which supports the dead end of the chain engages the spiral groove or thread in the screw shaft by having a pin fixed in the slide and projecting into such groove. This construction is liable to wear in time and give rise to a slight looseness. Such result is prevented, according to my present invention, by a new construction of the slide E whereby wear is automatically taken up and the parts are kept always in firm engagement. The slide E has a hard ball $q$ which engages for half its diameter in the spiral groove or thread $c$, and is engaged for the other half of its diameter by the material of the slide E, so that it cannot move laterally and its movement up or down forcibly carries the slide with it. The ball is movable only in radial direction, that is, toward or from the center of the screw shaft, and in this direction it is acted upon by a spring $r$ which constantly presses it toward the shaft and hence firmly seats it in the groove. The ball thus serves as a spring bolt and might be substituted by any other form of bolt, the ball or sphere being preferable because it may turn and distribute the wear. The spring $r$ shown is a leaf spring seated in a groove and fastened at its ends to the slide E. The ball is shown as seated in a radially-drilled hole with which the ball makes a close working fit, and the groove for the spring *r* is deep enough so that this spring may engage the outer side of the ball and press it inward, with allowance for such wear as may take place in the life of the instrument.

The slide E is in the form of a cylinder, making a free sliding fit within the tubular column F and bored through to make a free fit with the screw shaft H. The column F has along one side a vertical slot *s* in which slides a rib *t*, which may be formed integrally with the slide E or may be fastened to it, as shown. On the exterior of the column F is a plate *u* which is fastened to the slide E to move with it, such fastening being shown as made by means of screws *v v*, which screws also serve to fasten on a bracket *w*, the end of which serves for the attachment for the end of the chain D. The plate *u* may carry any suitable index marks for reading in connection with the graduated scale, which may conveniently be marked upon the exterior of the column F, as shown in Figs. 1 and 4. Preferably, the slide *u* carries graduations which serve as a vernier for use in connection with the stationary graduations.

The construction herein described is very neat, sightly and workmanlike, the column F affording a secure and compact support for the screw shaft H and a guide for the slide E. The screw and slide are concealed, except for the vernier plate *u*. The construction effectively provides for taking up all lost motion or looseness, so that the scale can quickly be brought to a balance. The invention also provides, as described, for operating the scale either from a crank on the base or from a crank or thumb wheel at the top of the column, so that each user may employ that means which he finds most convenient.

I claim as my invention:—

1. In a scale or balance of the chain type, the combination of a scale beam, a chain hung at one end therefrom, a vertically-movable slide from which the other or dead end of the chain is hung, a tubular column inclosing such slide, and means for adjusting the slide in said column, the slide being wholly within the column, the column having external graduations, and a vernier plate carried by the slide and movable outside the column, extending alongside said graduations and graduated in correlation therewith.

2. In a scale or balance of the chain type wherein the dead end of the chain is carried by a vertically-moving slide propelled up or down by a screw shaft, the combination with such screw shaft having a spiral groove, of such slide having a ball seated partly in the groove and partly in the slide.

3. In a scale according to claim 2, a spring for pressing the ball into the spiral groove.

4. In a scale according to claims 2 and 3, the slide having a groove, and a leaf spring confined in such groove and pressing against the ball.

5. In a scale or balance of the chain type, the combination of a scale beam, a weighing chain hung at one end therefrom, a vertically-movable slide from which the other or dead end of the chain is hung, a screw-shaft for propelling such slide up or down mounted to be vertically immovable, a crank shaft at right angles to said screw-shaft, friction gears on the respective shafts adapted to communicate motion from the crank shaft for turning the screw-shaft, and yielding means for pressing said gears together.

6. In a scale according to claim 5, the friction gear on the screw-shaft having a non-rotative longitudinally-movable engagement therewith, and a spring for pressing said friction gear yieldingly against the friction gear on the crank shaft.

7. In a scale according to claim 5, the friction gears relatively constructed to be relatively movable to change the gearing ratio.

8. In a scale or balance of the chain type wherein the dead end of the chain is carried by a vertically-moving slide propelled up or down by a screw shaft, the combination with the chain and such shaft and slide and a support for the latter, of means for turning the shaft adapted to be applied to its upper end.

9. In a scale according to claim 8, an operating knob or wheel adapted to be applied to the upper end of the screw shaft for turning it.

10. In a scale according to claim 8, a detachable turning device adapted to be applied to the upper end of the screw shaft for turning it.

11. In a scale or balance of the chain type, the combination of a scale beam, a weighing chain hung at one end therefrom, a vertically-movable slide from which the other or dead end of the chain is hung, a screw-shaft for propelling such slide up or down mounted to be vertically immovable, a crank-shaft at right angles to said screw-shaft and immovable in the direction of its length, friction gears on the respective shafts adapted to communicate motion from the crank-shaft for turning the screw-shaft, and yielding means for pressing one of said gears toward the other.

In witness whereof, I have hereunto signed my name.

CHRISTOPHER A. BECKER.